March 10, 1970     M. L. BISHOP     3,500,311

VEHICLE DUAL BRAKE CONDITION RESPONSIVE INDICATING SYSTEM

Filed May 9, 1967     2 Sheets-Sheet 1

INVENTOR
MICHAEL L. BISHOP
BY William R. O'Meara

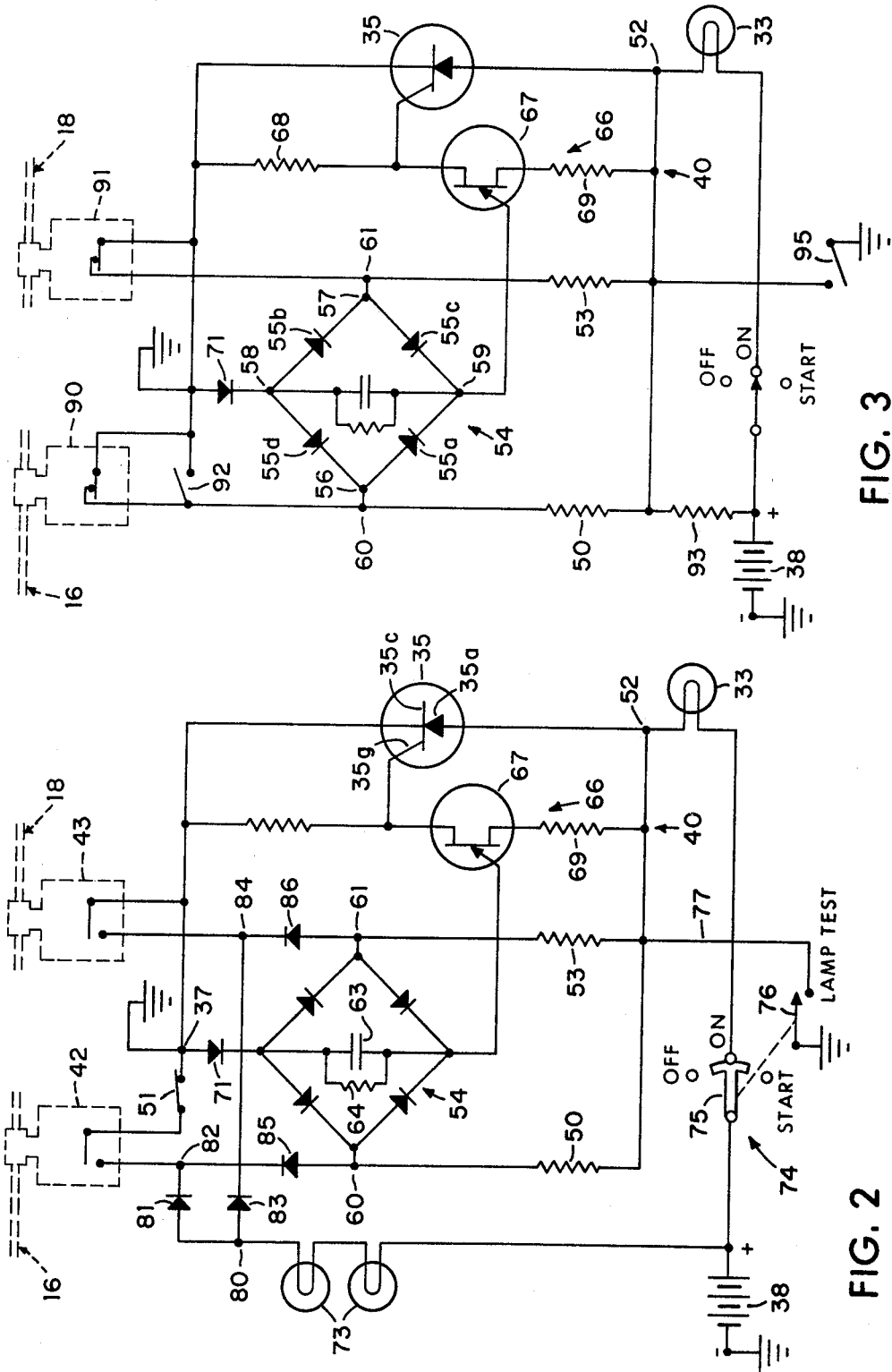

United States Patent Office 3,500,311
Patented Mar. 10, 1970

3,500,311
VEHICLE DUAL BRAKE CONDITION
RESPONSIVE INDICATING SYSTEM
Michael L. Bishop, St. Ann, Mo., assignor to Wagner Electric Corporation, Newark, N.J., a corporation of Delaware
Filed May 9, 1967, Ser. No. 637,114
Int. Cl. B60q 1/44
U.S. Cl. 340—52         22 Claims

ABSTRACT OF THE DISCLOSURE

An indicating circuit for producing a signal in response to the occurrence of a pressure failure in either of a pair of branches of a fluid pressure system including a signal lamp connected in series with a solid state switch that is fired into conduction by a switching device responsive to a predetermined value of voltage on a capacitor in a time constant circuit that is charged to the predetermined value whenever either of a pair of switches that are respectively responsive to the fluid pressures in the branches fails to become actuated in a preselected amount of time after the fluid pressure system has been operated, and a switch arranged to simulate a fluid pressure failure for testing the operativeness of the indicating circuit.

---

Figure 1:
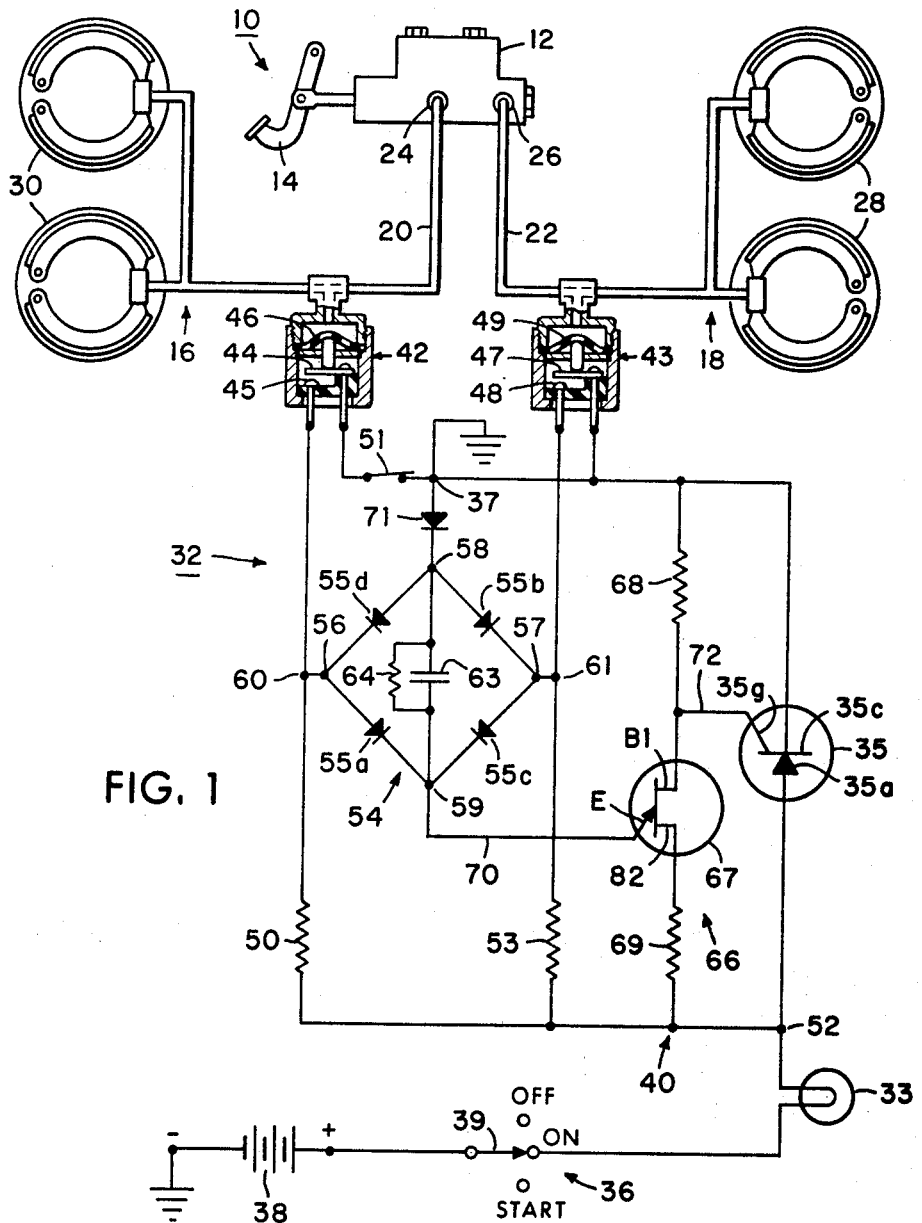

This invention relates to condition responsive systems and more particularly to circuit means for energizing a device when one of a plurality of conditions occurs, such as upon the occurrence of a pressure failure in a fluid pressure system.

In fluid pressure systems, for example, in vehicle dual hydraulic braking systems utilizing a dual master cylinder arrangement, fluid pressure is generally supplied substantially independently and simultaneously to a pair of fluid pressure branches connected respectively to the front and rear wheel brakes of the vehicle. In such systems it is highly desirable to provide means which will signal the vehicle operator in the event of a pressure failure in one of the fluid pressure branches. Otherwise, the operator may continue to operate the vehicle unaware that only one set of brakes is operable.

It is a general object of the present invention to provide novel condition responsive means that can be arranged to indicate the presence of a pressure loss in a fluid pressure system.

Another object is to provide a novel condition responsive circuit effective to energize a device upon the occurrence of either of a pair of selected conditions and which remains energized until selectively de-energized.

Another object is to provide a novel warning means for a fluid pressure system having a pair of fluid pressure branches supplied fluid pressure substantially simultaneously and independently, which produces a signal upon the occurrence of a pressure failure in either of the branches and which incorporates time delay means for avoiding unwarranted signals due to normal pressure differentials between the pressures in the branches.

Another object is to provide a novel indicating circuit for a fluid pressure system having a pair of fluid pressure branches supplied fluid pressure substantially simultaneously and independently that includes means for testing the operation of the indicating circuit.

Still another object is to provide novel warning means for a fluid pressure system having a pair of fluid pressure branches supplied fluid pressure substantially simultaneously and independently which utilizes reliable solid state elements.

Briefly, in accordance with one form of the present invention, circuit means for energizing an electric device includes switch means connected with the device, energy storage means, means including a pair of condition responsive means connected to effect charging of the energy storage means when one of the condition responsive means is actuated before the other, and means responsive to a charge on said storage means above a predetermined value for actuating the switch means to effect energization of the device.

These and other objects and advantages of the present invention will be apparent hereinafter.

In the drawings which illustrate embodiments of the invention,

FIG. 1 is a schematic diagram illustrating a fluid pressure braking system and fluid pressure failure indicating means embodying the present invention, FIG. 2 is a schematic diagram of a modified form of the fluid pressure failure indicating means, and FIG. 3 is a schematic diagram of another modified form of fluid pressure failure indicating means.

Referring now to FIG. 1 of the drawings, a split or dual fluid pressure vehicle braking system 10 is illustrated which includes a dual hydraulic master cylinder 12 shown as a conventional tandem master cylinder having a brake pedal 14 operatively connected thereto. As is well known in the art, a tandem master cylinder, such as master cylinder 12, usually includes a primary piston responsive to to the force applied to the brake pedal 14 to pressurize fluid in a primary pressure generating chamber connected to one set of wheel brakes, and a secondary piston movable in response to the fluid pressure in the primary chamber to pressurize fluid in the secondary pressure generating chamber that is connected to a different set of wheel brakes. One of the main advantages of employing a tandem master cylinder is, of course, that fluid pressure is supplied to the different sets of wheel brakes substantially simultaneously and independently. Thus, during a braking application, if brake actuating fluid pressure is not generated in the primary pressure chamber, due for example to a break in a fluid line or conduit connected therewith, the force applied to the brake pedal is mechanically transmitted to the secondary piston for actuating the set of wheel brakes associated therewith. On the other hand, if brake actuating fluid pressure is not generated in the secondary pressure chamber during a braking application, the pressure generated in the primary pressure chamber will move the secondary piston into engagement with its limit stop or forward end of the cylinder and thereafter effect operation of the set of wheel brakes associated with the primary chamber.

A pair of pressure fluid branches 16 and 18 including conduits 20 and 22 are connected respectively to the outlet ports 24 and 26 of the primary and secondary fluid pressure chambers of the master cylinder 12 for supplying fluid pressure, for example, to front and rear sets of wheel brakes 28 and 30, respectively. Each of the wheel brakes is diagrammatically illustrated as including a hydraulic wheel cylinder and a pair of brake shoes adapted to be operated thereby.

In the illustrated embodiment of the present invention, a condition responsive indicating circuit, indicated generally at 32, is utilized to detect and warn the vehicle operator in the event of a fluid pressure failure in either of the branches 16 and 18. The indicating circuit 32 includes a signal device shown as a signal lamp 33 which is preferably mounted in view of the vehicle operator, for example, on the dashboard of the vehicle. Lamp 33 is connected in series circuit relationship with switch means shown as a silicon controlled rectifier 35 between an "on" contact of a vehicle ignition switch indicated generally at 36, and a ground terminal 37 connected to the negative side or terminal of a vehicle battery 38. A movable contact 39 of ignition switch 36 is connected to the positive side or terminal of battery 38 and is shown in engagement with the "on" contact.

Silicon controlled rectifier 35 is a well-known three terminal solid state switching device having an anode 35a, cathode 35c and a control or gate 35g. Controlled rectifier 35 exhibits a high anode to cathode impedance in the absence of an actuating control voltage between the gate and cathode electrodes 35g and 35c but has a very low anode to cathode impedance when a control voltage of predetermined value is applied between the gate and cathode electrodes. Also, once the controlled rectifier 35 is actuated or fired into conduction, it remains conductive until the anode to cathode current substantially ceases to flow.

The controlled rectifier 35 is turned on or fired into conduction in response to a fluid pressure failure in either of the branches 16 and 18 by means of a condition responsive time delay control circuit, indicated generally at 40. Control circuit 40 includes a pair of like fluid pressure responsive switches 42 and 43 connected so as to be respectively responsive to the fluid pressures in the primary and secondary pressure generating chambers of master cylinder 12. The pressure switches 42 and 43 are shown as normally open hydraulic pressure actuated switches connected respectively in conduits 20 and 22 of branches 16 and 18. Pressure actuated switches 42 and 43 may be connected, if desired, directly to the master cylinder 12, such as by providing suitable ports therein that communicate respectively with the pressure generating chambers and securing the switches therein.

Pressure actuated switch 42 has a resilient movable contact 44 normally spaced from a stationary contact 45 and a hydraulic pressure responsive actuating diaphragm member 46 which moves contact 44 into engagement with contact 45 in response to fluid pressure in branch 16 above a predetermined amount. Similarly, pressure actuated switch 43 includes a resilient movable contact 47 normally spaced from stationary contact 48 and a hydraulic pressure responsive actuating diaphragm member 49 which moves contact 47 into engagement with contact 48 in response to fluid pressure in branch 18 above a predetermined amount. The switches 42 and 43 may be designed to be actuated at the same fluid pressure value.

Contacts 44 and 45 are connected in series circuit relation with a resistance element or resistor 50 and a normally closed circuit test switch 51 between the ground terminal 37 and a circuit point or terminal 52 which, in turn, is shown connected to the positive side of battery 38 through lamp 33 and the ignition switch 36. The test switch 51 is preferably mounted within the vehicle, for example on the dashboard, for manual operation by the vehicle operator, the purpose and function of test switch 51 being fully described hereinafter. The contacts 47 and 48 of pressure actuated switch 43 are connected in series circuit relation with a resistance element or resistor 53 between the ground terminal 37 and terminal 52. Thus, the series circuit including the contacts 47 and 48 and resistor 53 is connected in parallel circuit relation with the series circuit which includes contacts 44 and 45 and resistor 50.

Circuit 40 also includes a rectifier bridge circuit 54 having four one-way valves or diodes 55a, 55b, 55c and 55d interconnected to provide a pair of opposed bridge input terminals 56 and 57 and a pair of opposed bridge output terminals 58, 59. The diodes 55a–55d may be of any suitable type, such as semiconductor silicon diodes, and each is poled to pass current in the direction of the arrow which forms part of the symbol for the diode. The bridge terminals 56 and 57 are respectively connected to a pair of circuit points or terminals 60 and 61. Terminal 60 is located between pressure actuated switch 42 and resistor 50, and terminal 61 is located between pressure actuated switch 43 and resistor 53. Connected between the bridge terminals 58 and 59 are an energy storage device, shown as a capacitor 63, and a resistance element or resistor 64 connected across capacitor 63. The purpose and function of resistor 64 will be described hereinafter.

The controlled rectifier 35 is fired or triggered into conduction in response to a predetermined charge on the capacitor 63 by means of a trigger circuit, indicated at 66, which includes a voltage responsive switching device, shown as a unijunction transistor 67 having an emitter E, a base one B1 and a base two B2. Unijunction transistor 67 is a well-known semi-conductor device having a relatively high impedance between the emitter E and base B1 electrodes for voltages applied therebetween that are below a predetermined or peak point voltage value, but the impedance between these electrodes rapidly decreases to a low value when a voltage of the peak point value is applied thereto. The peak point voltage or voltage value at which a unijunction transistor is triggered into conduction is related to the voltage between the base one and base two electrodes and the intrinsic stand-off ratio, as is well known to those skilled in the art. A resistance element or load resistor 68 is connected between the base B1 and ground terminal 37, and a resistance element or resistor 69 is connected between the base B2 and terminal 52. The resistor 69 serves as temperature compensating means for the unijunction transistor 67 in that as the impedance from base B1 to base B2 varies with temperature, the drop across resistor 69 will also vary.

The resistance of the filament in lamp 33 is relatively low in comparison with the resistance of resistors 50 and 53 and the impedance of trigger circuit 66 so that any current flow in lamp 33 when controlled rectifier 35 is non-conductive or in the blocking state is insufficient to cause illumination from the lamp 33 or effective energization thereof. If desired, lamp 33 may be connected in series with rectifier 35 by connecting it between terminal 52 and the anode 35a with the terminal 52 connected directly to the "on" terminal of ignition switch 36.

The bridge terminal 59 is connected by a lead 70 to the emitter E, and the bridge terminal 58 is connected to ground terminal 37 through a one-way valve or diode 71 which is poled to pass current from terminal 37 to terminal 58. The base B1 is also connected to the gate 35g of controlled rectifier 35 by a lead 72, the gate 35g and cathode 35c being connected across load resistor 68. With this circuit arrangement, the voltage on capacitor 63 is applied to the emitter E of unijunction transistor 67, and whenever the capacitor 63 is charged to the predetermined voltage at which the unijunction transistor 67 fires, the capacitor 63 discharges therethrough. This capacitor discharge current flows from one side of capacitor 63 to the terminal 59, and through lead 70, emitter E, base B1, resistor 68, diode 71, and terminal 58 to the other side of capacitor 63. This discharge current produces a spike of voltage across resistor 68 which is impressed between the gate 35g and cathode 35c and is of sufficient magnitude to fire the controlled rectifier 35 into conduction and thereby turn on or energize lamp 33.

Under normal operating conditions when brake pedal 14 is in the retracted position, the contacts 44 and 45 of pressure actuated switch 42 and the contacts 47 and 48 of pressure actuated switch 43 are open, as shown in FIG. 1. With the pressure actuated switches 42 and 43 open, bridge terminals 56 and 57 are at the same potential and diode 71 blocks current flow into capacitor 63 to prevent the capacitor 63 from becoming charged. Current flows from battery 38 and through resistors 50 and 53, and diodes 55a and 55c to bridge terminal 59, and then from the emitter E to base B1 and through resistor 68 to ground terminal 37. Even though the unijunction transistor 67 is conductive when switches 42 and 43 are open, the resistance values of resistors 50 and 53, which values may be the same, and the resistance value of resistor 68 are related such that the voltage at B1 or across resistor 68 is insufficient to fire the controlled rectifier 35. The lamp 33, therefore, is not energized under normal operating conditions with both pressure actuated switches 42 and 43 open.

When the contacts of either one of the pressure actuated switches 42 and 43 close while the contacts of the other pressure actuated switch are open, the unijunction transistor 67 recovers to its non-conducting state to block current flow between the emitter E and base B1, and the capacitor 63 starts to charge through one of the resistors 50 and 53. The unijunction transistor 67 recovers because the emitter E is momentarily effectively placed at ground potential. The emitter E is effectively momentarily grounded because the capacitor 63 is connected between the emitter E and ground by means of one of the bridge diodes and has no voltage thereon at the time the one pressure actuated switch closes its contacts.

In considering the operation of the system of FIG. 1, it will first be assumed that the brake pedal 14 is depressed to effect a braking application and that contacts 44 and 45 are closed in response to the fluid pressure in branch 16 but that contacts 47 and 48 fail to close and remain open because of a pressure failure in branch 18, due for example to a break in conduit 22 or the like. Under these conditions, bridge terminal 58 and the side of capacitor 63 connected thereto are connected through diode 55d, closed contacts 44 and 45 and switch 51 to ground terminal 37, and current flows from the positive terminal of battery 38 to terminal 52 and through resistor 53 and diode 55c into capacitor 63. It will be apparent that resistor 53 and capacitor 63 form an RC time constant circuit such that the capacitor 63 will be charged to the predetermined value necessary to trigger unijunction transistor 67 after a predetermined time delay. When the voltage on capacitor 63 reaches the predetermined value, transistor 67 is triggered into conduction and the capacitor discharge current produces a spike of voltage across resistor 68 which fires the controlled rectifier 35 into its conductive state, thereby turning on or energizing lamp 33. Since the controlled rectifier 35 remains in its conductive state until the current therethrough substantially ceases, the lamp 33 will remain on even after the brake pedal has been released to continue to warn the vehicle operator that a fluid pressure failure has occurred in the brake system 10.

Should a pressure failure occur in branch 16 instead of in branch 18, due for example to a break in conduit 20 or the like, contacts 47 and 48 of pressure actuated switch 43 will close due to the fluid pressure in branch 18 when the brake pedal 14 is depressed to energize the brakes, but the contacts 44 and 45 of pressure actuated switch 42 will remain open due to the pressure failure in branch 16. Under these conditions, terminal 58 is connected to ground by diode 55b and the closed contacts 47 and 48 and current flows from the positive terminal of battery 38 through resistor 50 and diode 55a to capacitor 63 to cause the capacitor to charge. In this case resistor 50 and capacitor 63 form an RC time constant circuit so that capacitor 63 will charge up to the predetermined voltage value necessary for triggering unijunction transistor 67 after a predetermined time delay. When the capacitor 63 has been charged to the predetermined value, unijunction transistor 67 will be triggered into conduction and the spike of voltage across resistor 68 will fire controlled rectifier 35 into conduction and effect energization of lamp 33. The lamp 33 will remain on even after the brake 14 has been released to warn the vehicle operator that a pressure failure has occurred.

During normal operation of the brake system 10 when the brake pedal 14 is depressed, the contacts of pressure actuated switches 42 and 43 generally will not close at precisely the same time because of normal momentary or short-time fluid pressure differentials between the fluid pressures in branches 16 and 18. These fluid pressure differentials occur because the fluid pressure build-up in the secondary pressure chamber of a tandem master cylinder, such as master cylinder 12, usually lags the fluid pressure in the primary chamber since the fluid pressure in the secondary chamber is caused by the fluid pressure developed in the primary chamber. Also, the pressure actuated switches 42 and 43, even though they may be designed to be actuated at predetermined fluid pressure values, or at the same fluid pressure value, nevertheless may not be actuated at the designed fluid pressure value due to slight variations in the manufacture thereof. However, with a suitable time delay, as previously described herein, such short-time pressure differentials between the branches 16 and 18 will substantially prevent a false signal from the warning lamp 33. In other words, the capacitor 63 forms with each of the resistors 50 and 53 a time constant circuit which provides a suitable time delay so that the time between the actuation or closing of the two switches 42 and 43 will normally be less than the designed delay time. When one pressure actuated switch closes before the other under normal operating conditions of system 10, the capacitor 63 begins charging up but before the predetermined delay time has elapsed, and therefore before the voltage on capacitor 63 has reached the value necessary to fire unijunction transistor 67 into conduction, the other switch closes and the capacitor charging current ceases to flow since both bridge terminals 56 and 57 will then be at ground potential. Obviously, when both terminals 56 and 57 are at ground potential, no current flows from bridge terminal 59 to bridge terminal 58 to charge capacitor 63. Thus, normal short-time differences between the closing of switches 42 and 43 due to normal fluid pressure differences between the pressures in branches 16 and 18 or slight variations in the mechanical characteristics of the switches 42 and 43 will not produce a false indication of a fluid pressure failure in the brake system 10.

The contacts of pressure actuated switches 42 and 43 also may not open at the same time when the brake pedal 14 is released after a braking application because of mechanical differences in the switches and/or because of possible differences between the front and rear hydraulic brakes. However, the above-mentioned time delay of the circuit 40 can be chosen to prevent such normal differences in the opening of the switches 42 and 43 from triggering the controlled rectifier 35.

The resistor 64 connected across capacitor 63 provides an auxiliary discharge path for the capacitor 63 so that any charge on the capacitor due to the above-mentioned short-time differences in the closing of the switches 42 and 43 will be dissipated therethrough, and this maintains the delay time substantially constant.

The braking system 10, as well as the condition responsive circuit 32, can be readily tested to determine if both are functional. With the ignition switch 36 in the "on" position, if the pedal 14 is maintained depressed to supply fluid pressure to branches 16 and 18 for at least the predetermined delay time and the warning lamp 33 lights, this will, of course, indicate that one of the pressure actuated switches 42 and 43 has failed to close. This is an indication that a fluid pressure failure has occurred in one of the branches or that one of the pressure actuated switches has mechanically failed. If the lamp 33 does not come on under the above test conditions, it is still possible that a failure may have occurred in the condition responsive circuit 32, such as an open filament in lamp 33. However, by employing test switch 51, the circuit 32 can be tested to determine whether or not it is functioning properly. Circuit 32 may be tested by holding test switch 51 in the open contact position and the pedal 14 depressed to actuate both pressure actuated switches 42 and 43 for at least the predetermined delay time. This simulates a fluid pressure failure in branch 16 since the test switch 51 is connected in series with switch 42 and ground terminal 37. If the lamp 33 comes on, the circuit 32 is functioning properly. If lamp 33 does not come on under this last test procedure, the operator will be aware that a failure has occurred in the circuit 32.

The circuit arrangement and operation of the embodiment shown in FIG. 2 are essentially the same as those of the embodiment shown in FIG. 1 except that in FIG.

2 means are provided for testing the warning lamp 33 when the vehicle engine is started and for energizing tail lamps 73 in response to the actuation of either or both of the pressure actuated switches 42 and 43.

In FIG. 2 a modified ignition switch 74 is diagrammatically shown having a pair of ganged movable contact arms 75 and 76 and a "lamp test" contact which is connected by a lead 77 to terminal 52. Contact arm 76 is shown grounded and adapted for engagement with the "lamp test" contact when the vehicle engine is started. When starting the vehicle engine, the arm 75 engages the "on" and "start" contacts and connects the lamp 33 across the battery 38, thus providing an indication to the vehicle operator that lamp 33 is operable when it lights or should be replaced if it fails to light. Once the engine has started, the arm 75 is returned to the "on" position and the arm 76 breaks contact with the "lamp test" contact.

The circuit of FIG. 2 also includes an arrangement whereby vehicle tail lamps 73 are energized by actuation of the same pressure actuated switches, 42 and 43, that are used to signal the vehicle operator in the event of a fluid pressure failure in either of the branches 16 and 18. The tail lamps 73 are connected in series between the positive terminal of battery 38 and a circuit terminal 80. A one-way valve or diode 81 is connected between terminal 80 and a terminal 82 which, in turn, is connected to pressure actuated switch 42. Another diode 83 is connected between terminal 80 and a terminal 84 which, in turn, is connected to pressure actuated switch 43. Connected between terminals 60 and 82 is another one-way valve or diode 85. Connected between terminals 61 and 84 is still another diode 86.

Whenever pressure actuated switch 42 is closed during a braking application, current flows from the positive side of battery 38 through tail lamps 73, diode 81, switch 42, and test switch 51 to ground terminal 37 thereby lighting tail lamps 73. Similarly, when pressure actuated switch 43 closes during a braking application, current will flow from the battery 38 through the tail lamps 73, diode 83 and switch 43 to ground. With this arrangement, when either or both of the pressure actuated switches 42 and 43 are closed, the tail lamps 73 will be energized.

Diodes 85 and 86 are both poled to prevent any current flowing through lamps 73 from flowing into the rectifier bridge circuit 54. The diodes 81 and 83 are poled to pass energizing current through tail lamps 73 and serve to isolate terminals 82 and 84 from each other. With the diodes 81, 83, 85 and 86, the tail lamps 73 are energized in response to the actuation of one or both of the pressure actuated switches 42 and 43 and without interfering with the operation of the fluid pressure failure warning system.

The circuit arrangement and operation of the embodiment shown in FIG. 3 are similar to those of the embodiment shown in FIG. 1 except that in FIG. 3 a pair of normally closed fluid pressure responsive switches 90 and 91 are connected in fluid pressure communication with the branches 16 and 18. Also, a normally open test switch 92 is connected across switch 90, an additional resistance element or resistor 93 is arranged to maintain controlled rectifier 35 conductive after a fluid pressure failure has occurred and after the ignition switch 36 has been turned to the off position, and a lamp test switch 95 is used to test lamp 33.

When the brake pedal is in the retracted position, the contacts of both pressure actuated switches 90 and 91 of FIG. 3 are closed so that both bridge terminals 56 and 57 are at ground potential and the capacitor 63 has no charge thereon. Also, unijunction transistor 67 and controlled rectifier 35 will be in the blocking state with the lamp 33 off.

Under normal operating conditions when the brake pedal is depressed to apply the brakes, both pressure actuated switches 90 and 91 are actuated to the open contact position and current flows through resistors 50, 53, diodes 55a and 55c, between emitter E and base B1 through resistor 68 to ground terminal 37; however, the voltage drop across resistor 68 will be insufficient to fire controlled rectifier 35. Normal pressure differentials between the pressures in branches 16 and 18 normally will not effect energization of lamp 33 because of the time delay effect of capacitor 63 and resistors 50 and 53, as previously discussed herein in connection with FIG. 1.

Should a pressure failure occur in one of the fluid pressure branches 16 and 18 when the brake pedal is depressed, the pressure actuated switch connected in the branch having the pressure failure will remain closed while the other pressure switch is actuated to the open contact position. Under these conditions, the capacitor 63 will charge up through one of the resistors 50 and 53 to the predetermined voltage value necessary to trigger unijunction transistor 67 which, in turn, will fire controlled rectifier 35 into conduction and energize lamp 33.

Resistor 93 in FIG. 3 is connected in series with controlled rectifier 35 and in parallel with the ignition switch 36 and lamp 33 between the positive side of battery 38 and terminal 52. With this arrangement, whenever controlled rectifier 35 is fired into conduction in response to a pressure failure in one of the branches 16 and 18, current will flow from the positive side of battery 38 through resistor 93 and through the controlled rectifier 35, anode to cathode, to ground terminal 37 after the ignition switch 36 is turned to the off position. In this way the controlled rectifier 35 is maintained in its conductive state by this forward current flow therethrough so that when the operator subsequently turns the ignition switch to the "on" position the lamp 33 will immediately be energized to indicate that a pressure failure exists.

Test switch 92 in this instance is a normally open switch which is adapted to be manually closed to simulate a pressure failure in branch 16. The test procedure is the same for the circuit of FIG. 3 as for the circuits of FIGS. 1 and 2 except that after the brake pedal has been depressed and the test switch 92 is held closed for at least as long as the predetermined delay time and the lamp 33 lights to indicate that the warning system is operative, the lamp 33 will remain on or be turned on each time the ignition switch is turned on due to the presence of resistor 93; however, the lamp test switch 95, which may be used to normally test the lamp 33, can be closed and then opened to effect recovery of the controlled rectifier 35. In other words, after testing the indicating circuit by means of switch 92, the lamp 33 may be turned off by closing and then opening switch 95 since closing switch 95 will connect the anode of controlled rectifier 35 to ground to interrupt current flow therethrough and thereby effect recovery thereof to the nonconducting state.

The values of capacitor 63 and each of the resistors 50 and 53 may be chosen to provide various time delays for preventing or reducing the possibility of a false signal due to differences in time between the actuation of switches 42 and 43 (FIGS. 1 and 2) or switches 90 and 91 (FIG. 3). In some cases a time delay of a few seconds, such as 3 seconds, may be suitable for a particular fluid pressure braking system.

The embodiments of the invention in which an exclusive property or privilege is claimed are defined as follows:

1. An indicating circuit for a fluid pressure system having a pair of branches adapted to be supplied fluid pressure comprising signal means, a pair of fluid pressure responsive switch means connected for actuation respectively in response to fluid pressures in said branches, time delay means including energy storage means, circuit means connecting said pair of switch means with said time delay means to effect charging of said storage means in response to a fluid pressure failure in one of said branches, and other circuit means connected to effect energization of said signal means in response to predetermined charging of said storage means.

2. The indicating circuit of claim 1, including a manually actuated switch connected with one of said switch means to simulate a fluid pressure failure in said system.

3. The indicating circuit of claim 1, wherein said time delay means includes resistance means, and said energy storage means comprises capacitance means connected to be charged through said resistance means.

4. The indicating circuit of claim 3, wherein said other circuit means includes normally non-conductive switching means connected with said signal means to effect energization thereof when conductive, and voltage responsive means connected to said switching means and responsive to the charge on said capacitance means above a predetermined value to effect conduction of said switching means.

5. The indicating circuit of claim 4, wherein said switching means comprises a solid state switching device.

6. The indicating circuit of claim 4, wherein said switching means comprises a silicon controlled rectifier, and said voltage responsive means comprises a unijunction transistor.

7. A fluid pressure failure indicating circuit for a fluid pressure system having a pair of fluid pressure branches adapted to be supplied fluid pressure substantially simultaneously and independently comprising signal means, a pair of supply terminals adapted for connection with a source of current, a rectifier bridge circuit having four arms interconnected to provide first and second pairs of opposed bridge terminals, energy storage means connected between said first pair of bridge terminals, first impedance means connected between one bridge terminal of said second pair and one of said supply terminals, second impedance means connected between the other bridge terminal of said second pair and said one supply terminal, a pair of fluid pressure responsive switch means connected for actuation respectively in response to fluid pressures in said branches above a predetermined amount, means connecting one of said switch means between said one bridge terminal and the other of said supply terminals and the other of said switch means between said other bridge terminal and said other supply terminal, said energy storage means being charged through one of said impedance means when one of said switch means is actuated while the other of said switch means is unactuated, and control circuit means coupled to said signal means to effect energization thereof in response to a charge on said storage means above a predetermined voltage value.

8. The fluid pressure failure indicating circuit of claim 7, wherein said energy storage means comprises capacitance means and said impedance means comprise resistance means.

9. The fluid pressure failure indicating circuit of claim 7, wherein said signal means comprises an electric lamp.

10. The fluid pressure failure indicating circuit of claim 7, including a manually operable switch connected in circuit with one of said switch means to simulate a fluid pressure failure in one of said branches for testing the operativeness of said indicating circuit.

11. The fluid pressure failure indicating circuit of claim 8, wherein said control circuit means includes a switching device connected with said signal means and having control means for controlling the conductivity thereof, and voltage responsive circuit means connected to said first pair of bridge terminals to effect the discharge of said capacitance means when the voltage on said capacitance means exceeds said predetermined value, and means coupling said control means to said voltage responsive circuit means to effect conduction of said switching device and the energization of said signal means in response to the discharge of said capacitance means.

12. The fluid pressure failure indicating circuit of claim 11, wherein said switching device comprises a silicon controlled rectifier and said voltage responsive circuit means includes a unijunction transistor.

13. A fluid pressure failure indicating circuit for a fluid pressure system having a pair of fluid pressure branches connected respectively to a pair of fluid pressure actuated friction devices, and fluid pressure generating means for supplying fluid pressure to said branches substantially simultaneously and independently for actuating said friction devices comprising a pair of supply terminal means adapted to be connected to a current source, a pair of fluid pressure responsive switch means connected respectively in fluid pressure communication with said branches, each of said switch means including a pair of contacts operable between open and closed contact conditons, both of said switch means being normally in one of said contact conditions and actuated to the other of said contact conditions in response to fluid pressure above a predetermined amount in their respective branches, a first branch circuit connected between said supply terminal means and including first impedance means and the pair of contacts of one of said switch means in series circuit relation, a second branch circuit connected between said supply terminal means and in parallel circuit relation with said first branch circuit, said second branch circuit including second impedance means and the pair of contacts of said other switch means in series circuit relation, an energy storage circuit connected between a first circuit point located between said first impedance means and said pair of contacts of said one switch means and a second circuit point located between said second impedance means and said pair of contacts of said other switch means, said energy storage circuit including an energy storage device charged through one of said impedance means only when either one of said pairs of contacts is in said open contact condition while the other of said pairs of contacts is in said closed contact condition, first circuit means coupled to said energy storage device for discharging said storage device in response to a charge on said storage device above a predetermined value, signal means, and second circuit means coupled to said first circuit means and said signal means and responsive to the discharge of said storage means for energizing said signal means.

14. A condition responsive circuit for energizing an electric device comprising a pair of switch means, means for actuating each of said switch means, time delay means including energy storage means, circuit means connecting said pair of switch means with said time delay means to effect charging of said storage means only when one of said switch means is conductive while the other is non-conductive, and circuit means connected with said electric device and responsive to a predetermined charge on said storage means to effect energizatiaon of said electric device.

15. A condition responsive circuit for effecting energization of an electric device in response to predetermined conditions comprising a pair of supply terminals adapted for connection with a source of current, a rectifier bridge circuit having four arms interconnected to provide first and second pairs of opposed bridge terminals, energy storage means connected between said first pair of bridge terminals, first impedance means connected between one bridge terminal of said second pair of bridge terminals and one of said supply terminals, second impedance means connected between the other bridge terminal of said second pair of bridge terminals and said one supply terminal, a pair of condition responsive switch means each having conductive and non-conductive states, condition responsive means for actuating each of said switch means from one to the other of said states, means connecting one of said switch means between said one bridge terminal and the other of said supply terminals and the other of said switch means between said other bridge terminal and said other supply terminal, said energy storage means being charged through one of said impedance means when one of said switch means is in one of said states while the other of said switch means is in the other of said states, and control circuit means including voltage responsive means coupled to said in response to fluid pressure above a predetermined amount in their respective branches, a rectifier bridge circuit having four arms interconnected to provide first and second pairs of opposed bridge terminals, one-way valve means in each of said arms, capacitance means connected between said first pair of bridge terminals, first resistance means connected between one bridge terminal of said second pair of bridge terminals and one of said supply terminals, second resistance means connected between the other bridge terminal of said second pair of bridge terminals and said one supply terminal, said pair of contacts of one of said switch means being connected between said one bridge terminal and the other of said supply terminals, said pair of contacts of the other of said switch means being connected between said other bridge terminal and said other supply terminal, other one-way valve means connected between said other supply terminal and one bridge terminal of said first pair of bridge terminals, said energy storage means being charged through one of said resistance means when the pair of contacts of one of said switch means is in one of said contact conditions and the pair of contacts of the other of said switch means is in the other of said contact conditions, circuit means including resistor means, and a unijunction transistor having an emitter electrode, and first and second base electrodes connected in series with said resistor means between said supply terminals, means coupling said emitter electrode to the other bridge terminal of said first pair of bridge terminals, said transistor being responsive to a charge on said capacitance means above a predetermined value for discharging said capacitance means through said resistor means and said other one-way valve means, and means coupling said gate electrode to one of said base electrodes to first pair of bridge terminals and responsive to a voltage on said storage means above a predetermined value to effect the discharge thereof, and other means responsive to the discharge of said storage means for energizing said electric device.

16. The condition responsive circuit of claim 15, wherein said storage means comprises capacitance means, said first and second impedance means comprise resistance means, said voltage responsive means includes a unijunction transistor for discharging said capacitance means, and said other means includes a silicon controlled rectifier in series with said electric device between said supply terminals to effect energization of said electric device in response to the discharge of said capacitance means.

17. Fluid pressure failure indicating means for a fluid pressure vehicle braking system having a pair of fluid pressure branches connected respectively to a pair of fluid pressure actuated wheel brakes, and dual fluid pressure generating means for supplying fluid pressure in response to an applied force to said branches substantially simultaneously and independently for actuating said wheel brakes comprising a pair of supply terminals adapted for connection with a source of current, electric signal means, a silicon controlled rectifier having anode, cathode and gate electrodes, means connecting said anode and cathode electrodes in series with said signal means between said supply terminals, a pair of fluid pressure responsive switch means connected respectively in fluid pressure communication in said branches, each of said switch means including a pair of contacts actuated between open and closed contact conditons, both of said switch means being normally in one of said contact conditions and actuated to the other of said contact conditions effect conduction of said silicon controlled rectifier in response to the flow of discharge current through said resistor means to energize said signal means.

18. The fluid pressure failure indicating means of claim 17, wherein said signal means comprises an electric lamp.

19. The fluid pressure failure indicating means of claim 17, including a vehicle tail lamp connected between said one supply terminal and a circuit point located between the pair of contacts of one of said switch means and the bridge terminal connected thereto whereby said tail lamp is energized in response to the actuation of said last named switch means, and diode means connected between said last named bridge terminal and said circuit point and poled to prevent current flow from said tail lamp to said last named bridge terminal.

20. The fluid pressure failure indicating means of claim 17, including a vehicle tail lamp connected between one of said supply terminals and a first circuit point, a first diode connected between said first circuit point and the pair of contacts of one of said switch means, a second diode connected between said first circuit point and the pair of contacts of said other switch means, said first and second diodes being poled to pass energizing current through said tail lamp in response to actuation of said switch means, a third diode connected between said one bridge terminal of said second pair of bridge terminals and the pair of contacts of said one switch means, and a fourth diode connected between said other bridge terminal of said second pair of bridge terminals and the pair of contacts of said other switch means, said third and fourth diodes being poled to prevent current flow from said tail lamp to said rectifier bridge circuit.

21. The fluid pressure failure indicating means of claim 17, further including a manually operable switch connected in circuit with one of said switch means to simulate, when actuated, the failure of said last named switch means to actuate.

22. The fluid pressure failure indicating means of claim 17, including means connecting a vehicle ignition switch between said source of current and said signal means, and resistance means connected in parallel circuit relation with said ignition switch and said signal means and in series with said anode and cathode to maintain said silicon controlled rectifier conductive independently of said ignition switch.

References Cited

UNITED STATES PATENTS 3,439,322  4/1969  Gardner _____ 340—52

ALVIN H. WARING, Primary Examiner

U.S. Cl. X.R.

200—81.4; 340—242

UNITED STATES PATENT OFFICE
CERTIFICATE OF CORRECTION

Patent No. 3,500,311            Issued March 10, 1970

Michael L. Bishop

It is certified that error appears in the above-identified patent and that said Letters Patent are hereby corrected as shown below:

Column 10, line 73, after "said" delete down to and including "to" in Column 11, line 31. Column 12, line 3, after "conditions" insert -- in response to fluid pressure above a predetermined amount in their respective branches, a rectifier bridge circuit having four arms interconnected to provide first and second pairs of opposed bridge terminals, one-way valve means in each of said arms, capacitance means connected between said first pair of bridge terminals, first resistance means connected between one bridge terminal of said second pair of bridge terminals and one of said supply terminals, second resistance means connected between the other bridge terminal of said second pair of bridge terminals and said one supply terminal, said pair of contacts of one of said switch means being connected between said one bridge terminal and the other of said supply terminals, said pair of contacts of the other of said switch means being connected between said other bridge terminal and said other supply terminal, other one-way valve means connected between said other supply terminal and one bridge terminal of said first pair of bridge terminals, said energy storage means being charged through one of said resistance means when the pair of contacts of one of said switch means is in one of said contact conditions and the pair of contacts of the other of said switch means is in the other of said contact conditions, circuit means including resistor means, and a unijunction transistor having an emitter electrode, and first and second base electrodes connected in series with said resistor means between said supply terminals, means coupling said emitter electrode to the other bridge terminal of said first pair of bridge terminals, said transistor being responsive to a charge on said capacitance means above a predetermined value for discharging said capacitance means through said resistor means and said other one-way valve means, and means coupling said gate electrode to one of said base electrodes --.

Signed and sealed this 20th day of July 1971.

(SEAL)
Attest:

EDWARD M. FLETCHER, JR.
Attesting Officer

WILLIAM E. SCHUYLER, JR.
Commissioner of Patents